United States Patent [19]
Hunter

[11] 3,771,491
[45] Nov. 13, 1973

[54] CANINE JOHNNY
[76] Inventor: Australia Hunter, 1540 E. Ocean Front, Balboa, Calif. 92661
[22] Filed: Sept. 28, 1971
[21] Appl. No.: 184,481

[52] U.S. Cl. .................................................. 119/1
[51] Int. Cl. ........................................... A01k 29/00
[58] Field of Search ...................................... 119/1

[56] References Cited
UNITED STATES PATENTS
2,204,416   6/1940   Kramer .................................. 119/1
3,318,285   5/1967   Betham ................................. 119/1

*Primary Examiner*—Hugh R. Chamblee
*Attorney*—Theodore Bishoff et al.

[57] ABSTRACT

Canine Johnny, for the use of dogs, permanently installed in a domicile, or back yard, said Canine Johnny being provided with automatic flushing means for the disposition of residue, where in dogs may relieve themselves of organic wastes at will without human supervision or assistance, after the dog has been trained to use the Canine Johnny, and thus avoid befouling public or private environs.

4 Claims, 5 Drawing Figures

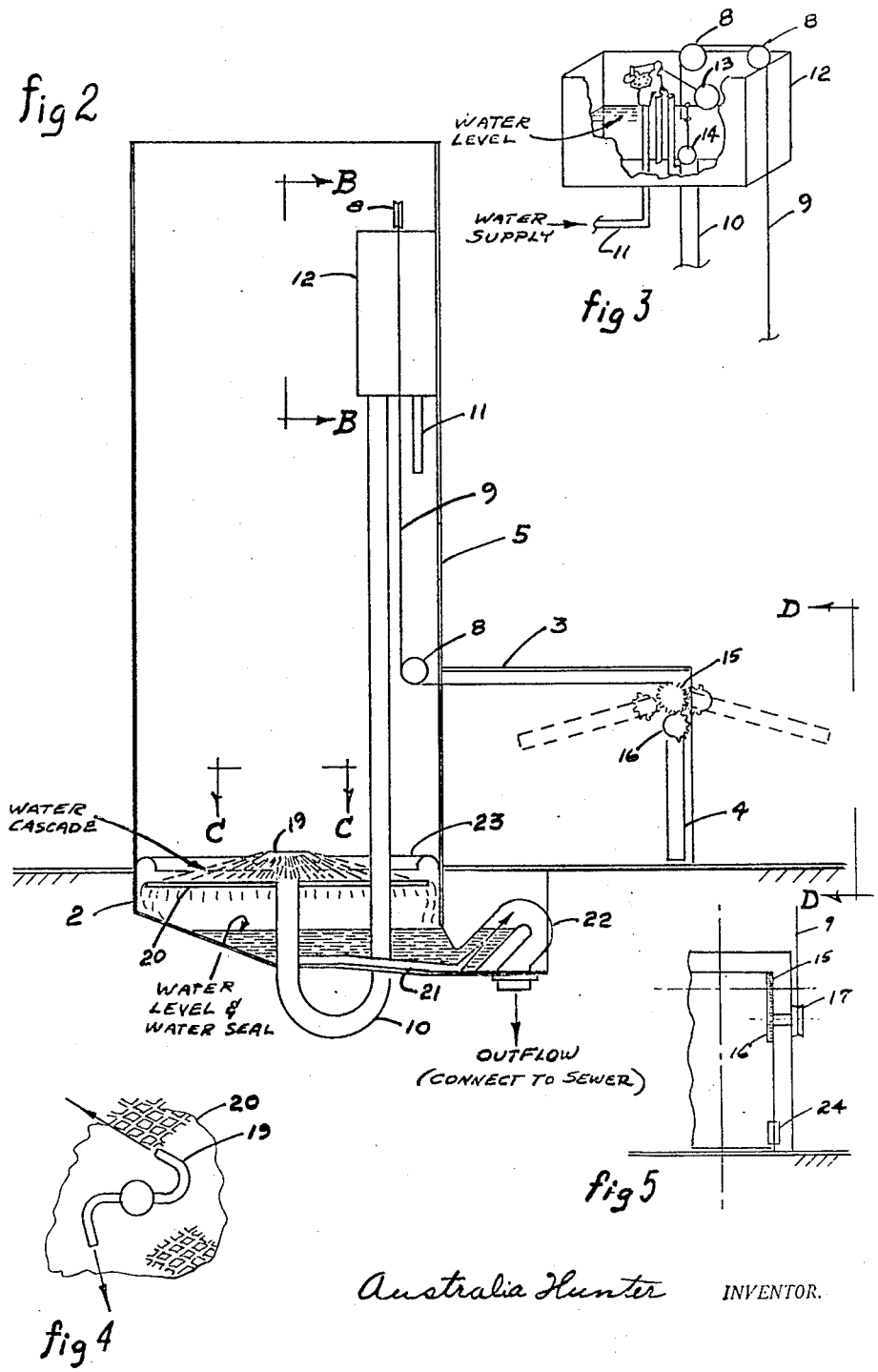

CANINE JOHNNY

This invention relates to a can Sanitary Facility and more particularly to a ficility of this character installed in a dwelling of human habitation and which facility is adapted to accommodating the natural needs of pets when confined in such dwellings to relieve themselves of waste matter in a designated and sanitary manner and without the necessity of being taken outdoors for the purpose of such relief. It has been demonstrated that pets, particularly dogs, can be trained to utilize the subject facility with very little trouble and in a very short time.

It is the principal object of this invention to provide a facility readily installed in the home which will be constantly available to the pet for the purpose of evacuating natural wastes, which facility may be used at will whether or not the pet owner or any human is at hand which will automatically dispose of such waste matter in a sanitary and harmless manner similar to the ordinary disposition of human waste daily throughout the civilized world such as is accomplished for example by the ubiquitous "Water Closet" or toilet commonly used by people.

Further objects of my invention will appear from the following description taken in connection with the accompanying drawings illustrating a preferred embodiment of the subject inention.

Referring now to Sheet 1 of 2 wherein:

FIG. 1 is an isometric view of the facility showing its outward appearance and also a portion situated below floor level. Referring now to Sheet 2 of 2 wherein:

FIG. 2 is a longitudinal median sectional view taken in the plane noted "A—A" on FIG. 1 (sheet 1 of 2)

FIG. 3 is a perspective view of as seen from the vantage point noted "B—B."

FIG. 4 is a partial plan view as seen from the vantage point noted "C—C."

FIG. 5 is a partial front elevation, as seen from the vantage point noted "D—D."

Figure 1:
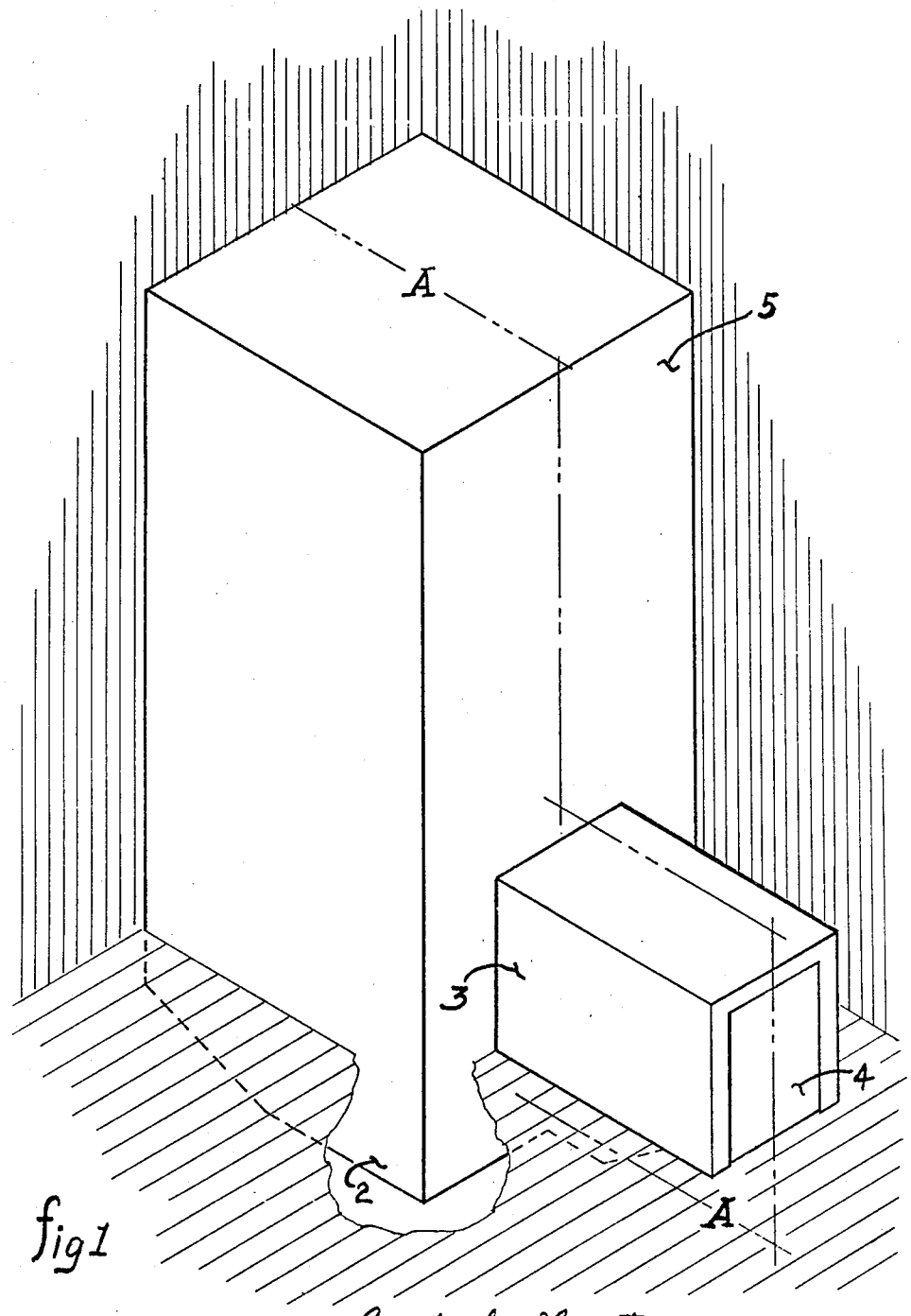

Referring now to sheet 1 of 2, item 2 indicates that portion of the total enclosure which is situated below floor level when in place. Item 3 represents a tunnel-like structure intended as a passage way for the animal. Item 4 represents a swing door articulated at its upper edge through a hinge pin (not shown) in such manner as to swing freely upon slight pressure at any point below the center line of the hinge pin. Item 5 represents a cabinet-like structure enclosing the whole which may be plain or decorative and incorporates a removable panel (not shown) for the purpose of providing access for repairs, maintenance or for convenience in training the animal. Referring now to FIG. 2 which shows a longitudinal median sectional view looking inboard from plane "A—A" (as indicated in FIG. 1 on sheet 1) except that tank 12 has not been sectioned along "A—A." Instead a perspective view seen from the vantage point "B—B" has been delineated and noted as FIG. 3. Item 13 of FIG. 3 shows a common Ball Cock assembly such as is used in any close coupled toilet flush tank. Item 11 of FIG. 3 is the water supply inlet pipe which replenishes the tank when its stored water gallonage has been expended. Item 14 of FIG. 3 is a common Ball Flush Valve which shuts off the stored water from the mouth of pipe 10 until ball 14 is elevated. Item 8 of FIG. 3 is one of 3 pulleys around which Cable 9 is successively reeved. Item 19 of FIGS. 2 and 4 is a rotating Jet Nossle assembly driven by the pressure of the very water it distributes similar in principal to a common type of lawn sprinkler except that one of its nozzles is offset at a dissimlar angle to the other for the purpose of obtaining greater water sweep coverage with respect to axial dispungement. Also the distributing ends of the nozzles have been inclined downward in order to direct the water stream obliquely although radially rather than in a laterally radial pattern (see "water cascade" FIG. 2). Item 20 FIG. 4 is a Platform of stainless steel plate, perforated, stretched, then rolled flat, commonly available with 65 percent open area and 35 percent web area per square foot. Item 23 FIG. 2 is a Splash Guard to retain any overspray of the water cascade. Item 2 shown in FIG. 1 and referenced in FIG. 2 is essentially a water basin so shaped as to store a constant pool of water and having a WATER SEAL by allowing an obliquely vertical column of water to rise to a common level in Gooseneck 22 (see "water level and water seal" in FIG. 2). Item 21 is a tube projecting laterally from the return branch of pipe 10 and terminating in a constricted nozzle obliquely elevated and centrally disposed in the upwardly inclined portion in gooseneck 22. The downwardly inclined portion of gooseneck 22 terminates in a common spud for connection to a sewer pipe (see "outflow" FIG. 2). Item 15 in FIG. 2 is a stationary gear mounted on the axis of the hinge pin (not shown) which (hinge pin) articulates swing door 4. Item 16 in FIG. 6 is a partial gear from which 50 percent of its teeth has been removed and which is rotatably mounted on swing door 4 in pitch center engagement with gear 15. Pulley 17 in FIG. 5 is axially connected to gear 16 so that rotation of gear 16 will urge likewise rotation of 17. While this is the preferred embodiment of mechanism to actuate cable 9 other methods of accomplishment involving bell cranks, levers, cams and pivots are not herewith excluded from use in this invention. Item 24 in FIG. 5 is a permanent magnet fixed to the framework of tunnel 3 in such manner as to present its north pole to the south pole of a similar magnet fixed on door 4 the purpose being to arrest undue vertical displacement of door 4. Having established nomenclature and description of individual parts and assemlies comprising the whole of my invention, I now describe its utilization;

In operation the animal and in particular a dog upon having been trained to enter and use the facility and upon volitionally heeding the "call to nature" proceeds to enter tunnel 3 by pushing swing door 4 inwardly with its head. The door is of light weight construction offering no appreciable resistance. Having then walked through tunnel 3 the dog has entered cabinet 5 is supported by platform 20. Presently the dog having attended to the business which urged it to enter now proceeds to leave by walking outwardly through tunnel 3. Door 4 is opened outwardly in the same manner as it was previously opened inwardly. The outward rotation of door 4 about its hinge pin actuates gear 16 since the outwardly disposed half of gear 16 is replete with teeth (the inwardly disposed half of gear 16 having been denuded of teeth was not urged to actuate). This actuation simultaneously rotates and actuates pulley 17 about which cable 9 has been reeved. This action urges cable 9 to elevate flush ball valve 14 upon which elevation the water gallonage stored in tank 12 gravitates downward through pipe 10. This downward rushing water column then issues through nozzle assembly 19 with sufficient velocity to cause terminal axis of pipe 10. The designed pattern of water dispungement thus scours every portion of platform 20 and all waste matter is washed downward through the open mesh of platform 20 or is scavenged peripherally off and is engulfed in the surging water fill of basin 2 and is finally disgorged to sewer through gooseneck 22 by the siphon action common to toilet bowls. When the gallonage stored in tank 12 has been dispensed ball valve 14 is reseated on the mouth of pipe 10 and tank 12 is replenished through inlet pipe 11. Other embodiments of my invention will readily occur to those skilled in the art and are covered by my claims which follow:

I claim:

1. A sanitary pet toilet comprising an upright cabinet, a basin on the lower end of said cabinet forming a hopper, a sewer trap connecting said base into a sewer, a perforate platform supported in a horizontal plane above said basin in said cabinet, a flush tank mounted in said cabinet substantially above said platform, a tunnel connected to the lower portion of said cabinet to provide pet access to said cabinet, a door closing the end of said tunnel opposite said cabinet and mounted for swinging movement about a horizontal pivot through the upper edge portion of said door, a fixed gear mounted on said tunnel adjacent one side edge of said door with the axis of said gear coincident with a pivot for said door, a second gear rotatably mounted on the said one side edge of said door and having gear teeth on about one-half the circumference thereof adapted for meshing with the gear teeth on said fixed gear, a sheave mounted on said second gear for rotation therewith, a cable wound on said sheave and having one end extending therefrom, a ball flush valve in said flush tank, a plurality of pulleys in said cabinet with said cable trained thereover and connected to said ball flush valve whereby the winding of said cable on said sheave on outward swinging movement of said door will lift said ball flush valve to flush said flush tank and inward swinging movement of said door will not wind the cable on said sheave and operate said ball flush valve, a flush pipe extending downwardly from said flush tank and with a U-bend upwardly centrally through said platform terminating slightly above said platform, and cascade means on the terminal end of said flush pipe for directing a flow of water across and through said perforate platform.

2. A device as claimed in claim 1 including an inwardly projecting splash shield in said cabinet overlying the side edges of said platform.

3. A device as claimed in claim 1 wherein the cascade comprises rotary jets rotated by the force of water flowing therefrom.

4. A device as claimed in claim 1 including magnetic means for maintaining said door in normally closed position.

* * * * *